US011994610B1

(12) United States Patent
Li et al.

(10) Patent No.: US 11,994,610 B1
(45) Date of Patent: May 28, 2024

(54) LORENTZ CONSTRAINT ANGLE ESTIMATION METHOD AND SYSTEM IN NON-GAUSSIAN ENVIRONMENT

(71) Applicant: Anhui University, Anhui (CN)

(72) Inventors: Liping Li, Anhui (CN); Lei He, Anhui (CN); Yingsong Li, Anhui (CN); Canping Yu, Anhui (CN); Run Ying, Anhui (CN)

(73) Assignee: ANHUI UNIVERSITY, Anhui (CN)

( * ) Notice: Subject to any disclaimer, the term of this patent is extended or adjusted under 35 U.S.C. 154(b) by 0 days.

(21) Appl. No.: 18/533,427

(22) Filed: Dec. 8, 2023

(30) Foreign Application Priority Data

Mar. 8, 2023 (CN) .......................... 202310238544.0

(51) Int. Cl.
*G01S 7/28* (2006.01)
*G01S 3/38* (2006.01)
(Continued)

(52) U.S. Cl.
CPC .............. *G01S 7/2813* (2013.01); *G01S 3/38* (2013.01); *G01S 7/356* (2021.05); *G06F 17/156* (2013.01); *G06F 17/16* (2013.01)

(58) Field of Classification Search
None
See application file for complete search history.

(56) References Cited

U.S. PATENT DOCUMENTS

| 2016/0043884 A1 | 2/2016 | Sandell |
| 2019/0050372 A1* | 2/2019 | Zeng ................... G06F 18/2135 |
| 2022/0268883 A1 | 8/2022 | Wu et al. |

FOREIGN PATENT DOCUMENTS

| CN | 108957390 A | 12/2018 |
| CN | 109917330 A | 6/2019 |

(Continued)

OTHER PUBLICATIONS

Khmou, Youssef; Safi, Said; Frikel, Miloud; Lorentzian Operator for Angular Source Localization with Large Array; Journal of Telecommunications and Information Technology; pp. 98-105; Apr. 2015.*

(Continued)

*Primary Examiner* — Vladimir Magloire
*Assistant Examiner* — David C. Schultz
(74) *Attorney, Agent, or Firm* — Pilloff Passino & Cosenza LLP; Rachel K. Pilloff; Sean A. Passino

(57) ABSTRACT

The disclosure provides a Lorentz constraint angle estimation method and a system in a non-Gaussian environment; the method includes the following steps: constructing an N-time slot received signal model based on a non-Gaussian noise environment to obtain a reflected signal; constructing a cost model based on Lorentz norm by a difference value between an actual received signal and the reflected signal, and performing an angle estimation by combining with an atomic norm to obtain a signal sparse reconstruction model; constructing an augmented Lagrangian function by the signal sparse reconstruction model, and carrying out the iterative update on the augmented Lagrangian function to obtain a reconstructed signal; and analyzing the reconstructed signal and searching spectral peaks globally to obtain spatial spectral peak points, and completing an angle estimation of the reconstructed signal.

8 Claims, 3 Drawing Sheets

(51) Int. Cl.
  *G01S 7/35*    (2006.01)
  *G06F 17/15*   (2006.01)
  *G06F 17/16*   (2006.01)

(56) References Cited

FOREIGN PATENT DOCUMENTS

| CN | 112731326 A | 4/2021 |
| CN | 114239644 A | 3/2022 |
| CN | 114879133 A | 8/2022 |
| CN | 114900400 A * | 8/2022 |

OTHER PUBLICATIONS

Fangqing Wen et al., "Angle estimation for bistatic MIMO radar in the presence of spatial colored noise," Signal Processing, Dec. 2016, pp. 261-267, 134.
Wen Fangqing et al., "Subspace and Sparse Bayesian Learning-Based DOA Estimation Method with Low Signal-to-Noise Ratio," Journal of Data Acquisition and Processing, Jul. 2013, pp. 460-465, vol. 28, No. 4.
First Office Action for China Application No. 202310238544.0, dated Jul. 17, 2023.
Notification to Grant Patent for China Application No. 202310238544.0, dated Sep. 3, 2023.
First Search Report for China Application No. 202310238544.0, dated Jul. 14, 2023.
Supplementary Search Report for China Application No. 202310238544.0, dated Aug. 31, 2023.

* cited by examiner

LORENTZ CONSTRAINT ANGLE ESTIMATION METHOD AND SYSTEM IN NON-GAUSSIAN ENVIRONMENT

CROSS-REFERENCE TO RELATED APPLICATIONS

This claims priority to Chinese Patent Application No. 202310238544.0, filed on Mar. 8, 2023, the contents of which are hereby incorporated by reference.

TECHNICAL FIELD

The disclosure relates to a technical field of signal processing, and in particular to a Lorentz constraint angle estimation method and a Lorentz constraint angle estimation system in a non-Gaussian environment.

BACKGROUND

Signal processing has been one of the hot research fields in recent ten years, and a target signal angle estimation is the key problem in signal processing. The target signal angle estimation is an important research direction in the field of array signal processing, and is widely used in radar, exploration, positioning and other fields, involving life, military and many other aspects. The main research direction is how to capture the position of the reconstructed signal more accurately from the background noise.

The basic task of the target signal angle estimation algorithm is to recover direction parameters of the unknown target signal in the spatial domain through signals received by the sensor array. The main technology is to complete the estimation process of the target signal direction in the spatial domain in a shorter time by using a small number of sensors, so as to obtain more accurate estimation results, and has certain robustness to Gaussian noise environment. At present, the most popular technology is the method based on sparse reconstruction; generally, a norm $l_2$ is used to construct a cost function, combining a norm $l_1$ for reconstruction representation, or combining the norm $l_2$ and an atomic norm to construct a sparse reconstruction model. However, the models all have some defects, such as not considering the off-grid problem, or not being robust to the angle estimation in non-Gaussian noise environment, thus eventually seriously affecting the estimation accuracy of the reconstructed signal.

SUMMARY

In order to solve above technical problems, the disclosure provides a Lorentz constraint angle estimation method and a Lorentz constraint angle estimation system in a non-Gaussian environment, so as to achieve higher estimation accuracy, faster iterative convergence speed and lower computational complexity.

In order to achieve the above object, the present disclosure provides a Lorentz constraint angle estimation method in a non-Gaussian environment, including following steps:
constructing an N-time slot received signal model based on a non-Gaussian noise environment to obtain a reflected signal;
constructing a cost model based on Lorentz norm by a difference value between an actual received signal and the reflected signal, and performing an angle estimation by combining with an atomic norm to obtain a signal sparse reconstruction model;
constructing an augmented Lagrangian function by the signal sparse reconstruction model, and carrying out the iterative update on the augmented Lagrangian function to obtain a reconstructed signal; and
analyzing the reconstructed signal and searching spectral peaks globally to obtain spatial spectral peak points, and completing an angle estimation of the reconstructed signal.

Optionally, the constructing the N-time slot received signal model includes:
based on the non-Gaussian noise system environment, using Intelligent Reconfigurable Surface to reflect a target signal and non-target interference signals, adjusting amplitudes and phases of the target signal and the interference signals, and converging the target signal and the interference signals on a same channel of a receiver to construct the N-time slot received signal model.

Optionally, the N-time slot received signal model is:

$$r = GA(\theta)s + Ga(\psi)q + \omega$$

where G is an amplitude-phase control matrix of Intelligent Reconfigurable Surface, $A(\theta)$ is an angle control matrix of Intelligent Reconfigurable Surface, s is a reflected signal of the target signal passing through Intelligent Reconfigurable Surface, $a(\psi)$ is an angle control vector of Intelligent Reconfigurable Surface, q is the interference signal from a non-target and co is a system noise.

Optionally, the cost model based on Lorentz norm is:

$$\|k\|_{LL_2,\gamma} = \sum_{i=1}^{m} \log\left(1 + \frac{k_i^2}{\gamma^2}\right), k = r - z, \gamma > 0$$

$$z = GA(\theta)s + Ga(\psi)q$$

where $\|k\|_{LL_2,\gamma}$ represents a Lorentz norm model, $\gamma$ represents a scale parameter of the norm, z represents the reflected signal passing through Intelligent Reconfigurable Surface, r represents an actual received signal at a receiving end, m represents a time slot length, $k_i$ represents a difference value between a received signal in an i-th time slot and the reflected signal passing through Intelligent Reconfigurable Surface.

Optionally, the signal sparse reconstruction model is:

$$\min_{x,q} \|r - z\|_{LL_2,\gamma} + \rho\|x\|_A$$

where $x = A(\theta)s$, $\rho$ is the regularization parameter and x is the reconstructed signal.

Optionally, the constructing the augmented Lagrangian function includes:
using an augmented Lagrangian and alternating direction mixed multiplier method to transform a minimum optimization problem of the signal sparse reconstruction model into the augmented Lagrangian function:

$$\mathcal{L}_\tau(x, q, u, t, z, Y, P, w) = \|r - z\|_{LL2},$$

$$\gamma + \frac{\rho}{2}(u_0 + t) + \left\langle P, Y - \begin{pmatrix} Toep(u) & x \\ x^H & t \end{pmatrix} \right\rangle +$$

-continued $$\langle Gx+cq-z, w\rangle + \tau\left\|Y-\begin{pmatrix}Toep^H(u) & x \\ x^H & t\end{pmatrix}\right\|_F^2 + \tau\|Gx+cq-z\|_2^2,$$

where x is the reconstructed signal, q is the interference signal, u represents a random signal with a same matrix dimension as the reconstructed signal x, t is an auxiliary variable of the atomic norm, z represents the reflected signal passing through Intelligent Reconfigurable Surface, $$Y = \begin{pmatrix}Toep(u) & x \\ x^H & t\end{pmatrix},$$

P and w are auxiliary parameters in an augmented Lagrangian multiplier method, ρ is the regularization parameter, and τ is a penalty coefficient in a Lagrangian and alternating direction mixed multiplier method.

Optionally, carrying out the iterative update on the augmented Lagrangian function includes:
carrying out the iterative update by using the alternating direction mixed multiplier method, and the iterative equation is:

$$\{x^{i+1},q^{i+1},u^{i+1},t^{i+1},z^{i+1}\}=\mathrm{argmin}_{x,q,u,t,z}\mathcal{L}_\tau(x,q,u,t,z,Y^i,P^i,\omega^i)$$

$$q^{i+1} = \frac{1}{\tau\|c\|_2^2}c^H(\tau z^i - 0.5_{W^i} - \tau Gx^i)$$

$$x^{i+1}=(\tau G^H G+2\tau I)^{-1}[2\tau y^i_2+p^i_2-G^H(0.5\omega^i+\tau q^{i+1}c-\tau z^i)]$$

$$w^{i+1}=w^i+0.5\rho(Gx^{i+1}+cq^{i+1}-z^{i+1})$$

$$z^{i+1} = \frac{2kr+w^{i+1}+2\tau(Gx^{i+1}+cq^{i+1})}{2k+2\tau}$$

$$t^{i+1} = y_3^j + \frac{p_3^i}{2\tau} - \frac{\rho}{4\tau}s$$

where $(\bullet)^i$ represents an i-th iteration, $q^{i+1}$, $x^{i+1}$, $w^{i+1}$, $z^{i+1}$ and $t^{i+1}$ respectively represent an interference signal, a reconstructed signal, an auxiliary parameter constraining the reconstructed signal, a reflected signal passing through Intelligent Reconfigurable Surface and an atomic norm auxiliary variable of an i+1 iteration.

Optionally, obtaining the spatial spectral peak points includes:
analyzing the reconstructed signal by using a multi-signal classification technology to obtain a Hankel matrix, and performing a singular value decomposition on the Hankel matrix to obtain a signal subspace and a noise subspace; using an orthogonality of a signal direction vector and the noise subspace to construct a spatial scanning spectrum, and searching the spectral peaks globally to obtain the spatial spectral peak points, and completing the angle estimation of the reconstructed signal.

In order to achieve the above purpose, the disclosure also provides a system for realizing the Lorentz constraint angle estimation method in the non-Gaussian environment, and the system includes a received signal model construction module, an angle estimation model construction module, a function construction module, a reconstructed signal obtaining module and a multi-signal classification algorithm analysis module;

the received signal model construction module is used for constructing the N-time slot received signal model;

the angle estimation model construction module is used for constructing a cost function of Lorentz norm constraint by using a difference value between the received signal and the reflected signal passing through Intelligent Reconfigurable Surface, and restating an angle estimation problem into the signal sparse reconstruction model by combining with the atomic norm, and converting the angle estimation problem into a minimum optimization problem;

the reconstructed signal obtaining module is used for obtaining an iterative updating equation by adopting the Lagrangian and alternating direction mixed multiplier method to obtain a reconstructed signal; and the multi-signal classification algorithm analysis module is used for analyzing the reconstructed signal by using the multi-signal classification technology to obtain the Hankel matrix, and performing the singular value decomposition on the Hankel matrix to obtain the signal subspace and the noise subspace; using the orthogonality of the signal direction vector and the noise subspace to construct the spatial scanning spectrum, and searching the spectral peaks globally to obtain the spatial spectral peak points, and completing the angle estimation of the reconstructed signal.

Compared with the prior art, the disclosure has following advantages and technical effects:

In the disclosure, according to the difference value between the actual signal obtained by the receiver and the reflected signal obtained through Intelligent Reconfigurable Surface, the error function of Lorentz norm constraint is constructed to suppress the interference of system noises such as non-Gaussian noise on the angle estimation of the reconstructed signal; in order to eliminate the interference of non-target signals and improve the robustness of the estimation algorithm, the atomic norm is selected to perform a sparse reconstruction on the reconstructed signal; the iterative updating equation is obtained by using the Lagrangian and alternating direction mixed multiplier method, thus may effectively reducing the computational complexity of this sparse reconstruction model and obtaining the reconstructed signal; the multi-signal classification technology is used to analyze the reconstructed signal to obtain the Hankel matrix, and the signal subspace and the noise subspace are obtained by performing the singular value decomposition on the Hankel matrix; the spatial scanning spectrum is constructed by using the orthogonality of the signal direction vector and the noise subspace, and the spectral peaks are searched globally to obtain the spatial spectral peak points, and the angle estimation of the reconstructed signal is completed.

The error function based on Lorentz may reduce the influence of outlier error, restrain the influence of non-Gaussian noise environment, reduce the interference of non-Gaussian noise on the estimation result, and improve the estimation accuracy of signal angle in actual environment. Using the atomic norm to control the sparse signal may effectively reduce the interference of non-target signals, and also effectively improve the robustness of the estimation algorithm and improve the estimation accuracy. The disclosure may achieve higher estimation accuracy, faster iterative convergence speed and lower computational complexity.

BRIEF DESCRIPTION OF THE DRAWINGS

The accompanying drawings constituting a part of the disclosure are used to provide a further understanding of the disclosure. Illustrative embodiments of the disclosure the disclosure and the descriptions are used to explain the application, and do not constitute an improper limitation of the disclosure. In the attached drawings.

DETAILED DESCRIPTION OF THE EMBODIMENTS

It should be noted that the embodiments in the disclosure and the features in the embodiments may be combined with each other without conflict. The disclosure is described in detail with reference to the attached drawings and embodiments.

It should be noted that the steps shown in flowcharts of the accompanying drawings may be executed in a computer system such as a set of computer-executable instructions, and although logical orders are shown in the flowcharts, in some cases, the steps shown or described may be executed in a different order from here.

Figure 1:
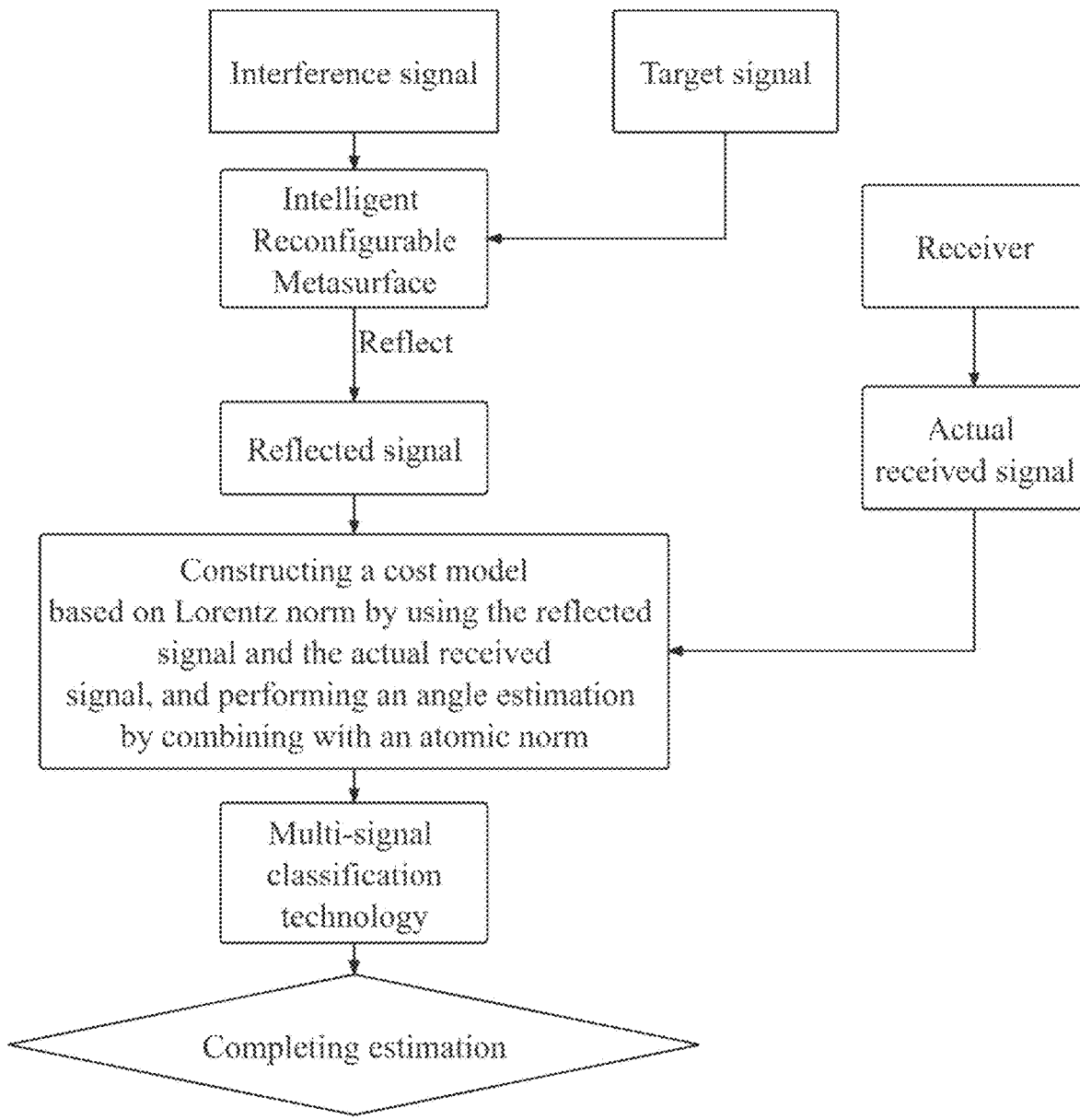
FIG. 1 is a flowchart of a Lorentz constraint angle estimation method in a non-Gaussian environment according to an embodiment of the present disclosure.

As shown in FIG. 1, a flow of a Lorentz constraint angle estimation method in a non-Gaussian environment includes following steps:

According to the non-Gaussian noise system environment, using Intelligent Reconfigurable Surface to reflect a signal from a target and an interference signal from a non-target, adjusting amplitudes and phases, and converging on a channel of a receiver, so as to construct N-time slot received signal model.

Constructing a cost function of Lorentz norm constraint by using a difference value between the received signal and the reflected signal passing through Intelligent Reconfigurable Surface, and restating an angle estimation problem into the signal sparse reconstruction model by combining with the atomic norm, and converting the angle estimation problem into a minimum optimization problem.

An error signal cost function of Lorentz norm constraint is:

$$\|k\|_{LL_2,\gamma} = \sum_{i=1}^{m} \log\left(1 + \frac{k_i^2}{\gamma^2}\right), k = r - z, \gamma > 0$$

$z = GA(\theta)s + Ga(\psi)q$ $\|k\|_{LL_2,\gamma}$ represents a Lorentz norm model, $\gamma$ represents a scale parameter of the norm, z represents the reflected signal passing through Intelligent Reconfigurable Surface, r represents the actual received signal at a receiving end, m represents a time slot length, $k_i$ represents a difference value between a received signal in an i-th time slot and the reflected signal passing through Intelligent Reconfigurable Surface.

The atomic norm is used to obtain the sparse characteristics of the reconstructed signal and eliminate the interference of the non-target signal. A sparse reconstruction model $$\min_{x,q} \|r - z\|_{LL_2,\gamma} + \rho \|x\|_A$$

$\|r-z\|_{LL_2,\gamma} + \rho\|x\|_A$ is obtained by combining Lorentz norm and atomic norm, where $x = A(\theta)s$, $\rho$ is the regularization parameter and x is the reconstructed signal.

Based on characteristics of Lorentz norm and atomic norm, the cost function may be restated as:

$$\min_{x,q} \|r - z\|_{LL_2,\gamma} + \frac{\rho}{2M} Tr\{Q(u)\} + \frac{\rho}{2}t,$$

$$\text{subject to } Y = \begin{bmatrix} Q(u) & x \\ x^H & t \end{bmatrix}, Y \succeq 0$$

where M is a number of element blocks of RIS, u represents a random signal with a same matrix dimension as the reconstructed signal x, Q(u) represents a symmetric Toeplitz matrix generated by u, (•)≽0 represents a semi-definite matrix, and this sparse reconstruction model is transformed into a minimization problem of the cost function, where $z = Gx + cq$, $c = Ga(\psi)$.

Using an augmented Lagrangian and alternating direction mixed multiplier method to transform a minimum optimization problem into the augmented Lagrangian function:

$$\mathcal{L}_\tau(x, q, u, t, z, Y, P, w) = \|r - z\|_{LL_2},$$

$$\gamma + \frac{\rho}{2}(u_0 + t) + \left\langle P, Y - \begin{pmatrix} Toep(u) & x \\ x^H & t \end{pmatrix} \right\rangle +$$

$$\langle Gx + cq - z, w \rangle + \tau \left\| Y - \begin{pmatrix} Toep^H(u) & x \\ x^H & t \end{pmatrix} \right\|_F^2 + \tau \|Gx + cq - z\|_2^2,$$

where x is the reconstructed signal, q is the interference signal, u represents a random signal with a same matrix dimension as the reconstructed signal x, t is an auxiliary variable of the atomic norm, z represents the reflected signal passing through Intelligent Reconfigurable Surface, $$Y = \begin{pmatrix} Toep(u) & x \\ x^H & t \end{pmatrix},$$

P and w are auxiliary parameters in an augmented Lagrangian multiplier method, $\rho$ is the regularization parameter, and $\tau$ is a penalty coefficient in a Lagrangian and alternating direction mixed multiplier method.

Obtaining an iterative updating equation by using an alternating direction mixed multiplier method, and obtaining a reconstructed signal, where the iterative equation is:

$$(x^{i+1}, q^{i+1}, u^{i+1}, t^{i+1}, z^{i+1}) = \operatorname{argmin}_{x,q,u,t,z} \mathcal{L}_\tau(x, q, u, t, z, Y^i, P^i, \omega^i)$$

$$q^{i+1} = \frac{1}{\tau \|c\|_2^2} c^H(\tau z^i - 0.5 w^i - \tau G x^i)$$

$$x^{i+1} = (\tau G^H G + 2\tau I)^{-1}[2\tau y_2^i + p_2^i - G^H(0.5 w^i + \tau q^{i+1} c - \tau z^i)]$$

$$w^{i+1} = w^i + 0.5\rho(Gx^{i+1} + cq^{i+1} - z^{i+1})$$

$$z^{i+1} = \frac{2kr + w^{i+1} + 2\tau(Gx^{i+1} + cq^{i+1})}{2k + 2\tau}$$

$$t^{i+1} = y_3^i + \frac{p_3^i}{2\tau} - \frac{p}{4\tau}s$$

where $(\bullet)^i$ represents an i-th iteration, parameter results of the i-th iteration are used to update the results of the i+1-th iteration, and more accurate results are obtained through repeated iterations. $q^{i+1}$, $x^{i+1}$, $w^{i+1}$, $z^{i+1}$ and $t^{i+1}$ respectively represent an interference signal, a reconstructed signal, an auxiliary parameter constraining the reconstructed signal, a reflected signal passing through Intelligent Reconfigurable Surface and an atomic norm auxiliary variable of an i+1 iteration.

Analyzing the reconstructed signal by using a multi-signal classification technology to obtain a Hankel matrix, and performing a singular value decomposition on the Hankel matrix to obtain a signal subspace and a noise subspace; using an orthogonality of a signal direction vector and the noise subspace to construct a spatial scanning spectrum, and searching the spectral peaks globally to obtain the spatial spectral peak points, and completing the angle estimation of the reconstructed signal.

Figure 2:
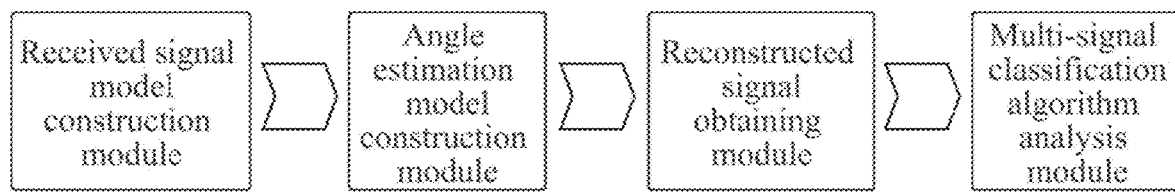
FIG. 2 is a schematic diagram of modules of a system according to an embodiment of the present disclosure.

As shown in FIG. 2, the disclosure also provides a system for realizing the Lorentz constraint angle estimation method in the non-Gaussian environment. The system mainly includes a receiving signal model construction module, an angle estimation model construction module, a function construction module, a reconstructed signal obtaining module and a multi-signal classification algorithm analysis module.

The received signal model construction module is used for constructing the N-time slot received signal model according to the non-Gaussian noise environment;

the angle estimation model construction module is used for constructing a cost function of Lorentz norm constraint by using a difference value between the received signal and the reflected signal passing through Intelligent Reconfigurable Surface, and restating an angle estimation problem into the signal sparse reconstruction model by combining with the atomic norm, and converting the angle estimation problem into a minimum optimization problem;

the reconstructed signal obtaining module is used for obtaining an iterative updating equation by adopting the Lagrangian and alternating direction mixed multiplier method to obtain a reconstructed signal; and the multi-signal classification algorithm analysis module is used for analyzing the reconstructed signal by using the multi-signal classification technology to obtain the Hankel matrix, and performing the singular value decomposition on the Hankel matrix to obtain the signal subspace and the noise subspace; using the orthogonality of the signal direction vector and the noise subspace to construct the spatial scanning spectrum, and searching the spectral peaks globally to obtain the spatial spectral peak points, and completing the angle estimation of the reconstructed signal.

Figure 3:
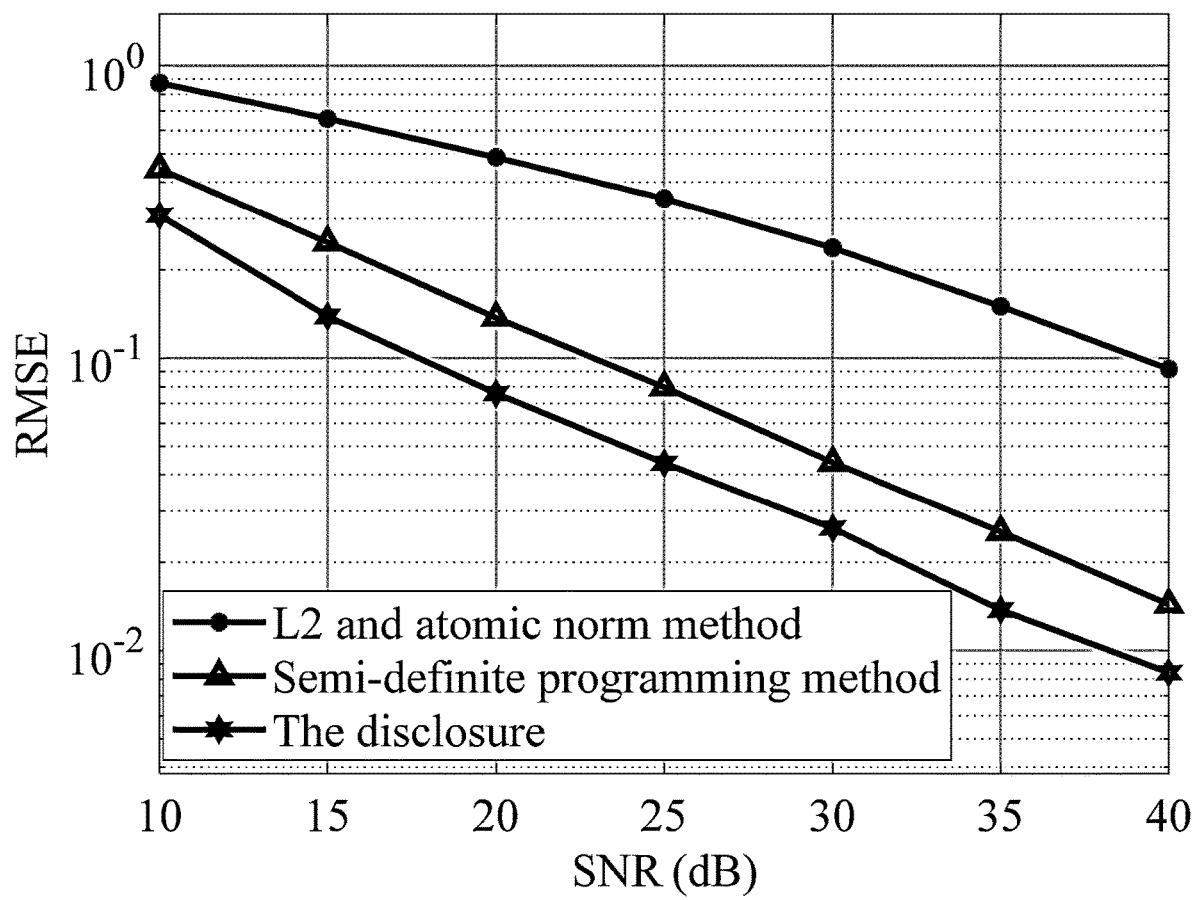
FIG. 3 is a schematic diagram of results of the Lorentz constraint angle estimation method in the non-Gaussian environment according to an embodiment of the present disclosure.

FIG. 3 shows estimation results of the Lorentz constraint angle estimation method in the non-Gaussian environment. Various estimation methods are applied in the non-Gaussian noise environment, and the fast Fourier transform method, the L2 norm and the atomic norm joint method, and the semi-definite programming method are compared with the method of the present disclosure. As may be seen from FIG. 3, compared with the existing angle estimation methods, the estimation method of the present disclosure has smaller estimation root mean square error, faster iterative convergence speed and lower computational complexity.

The above is only the preferred embodiment of the disclosure, but the protection scope of the disclosure is not limited to this. Any change or replacement that may be easily thought of by a person familiar with this technical field within the technical scope disclosed in the disclosure should be included in the protection scope of the disclosure. Therefore, the protection scope of the disclosure should be based on the protection scope of the claims.

What is claimed is:

1. A Lorentz constraint angle estimation method in a non-Gaussian environment, comprising:

constructing an N-time slot received signal model based on a non-Gaussian noise environment to obtain a reflected signal;

the constructing the N-time slot received signal model comprises:

based on a non-Gaussian noise system environment, using Intelligent Reconfigurable Surface to reflect a target signal and non-target interference signals, adjusting amplitudes and phases of the target signal and interference signals, and converging the target signal and the interference signals on a same channel of a receiver to construct the N-time slot received signal model;

constructing a cost model based on Lorenz norm by a difference value between an actual received signal and the reflected signal, and performing an angle estimation by combining with an atomic norm to obtain a signal sparse reconstruction model;

constructing an augmented Lagrangian function by the signal sparse reconstruction model, and carrying out an iterative update on the augmented Lagrangian function to obtain a reconstructed signal; and analyzing the reconstructed signal and searching spectral peaks globally to obtain spatial spectral peak points, and completing an angle estimation of the reconstructed signal.

2. The Lorentz constraint angle estimation method in the non-Gaussian environment according to claim 1, wherein the N-time slot received signal model is:

$r = GA(\theta)s + Ga(\psi)q + \omega$ wherein G is an amplitude-phase control matrix of Intelligent Reconfigurable Surface, $A(\theta)$ is an angle control matrix of Intelligent Reconfigurable Surface, s is a reflected signal of a target signal passing through Intelligent Reconfigurable Surface, $a(\psi)$ is an angle control vector of Intelligent Reconfigurable Surface, q is the interference signal from a non-target and $\omega$ is a system noise.

3. The Lorentz constraint angle estimation method in the non-Gaussian environment according to claim 1, wherein the cost model based on Lorenz norm is:

$$\|k\|_{LL_2,\gamma} = \sum_{i=1}^{m} \log\left(1 + \frac{k_i^2}{\gamma^2}\right), k = r - z, \gamma > 0$$

$z = GA(\theta)s + Ga(\psi)q$ wherein $\|k\|_{LL_2,\gamma}$ represents a Lorentz norm model, $\gamma$ represents a scale parameter of a norm, z represents the reflected signal passing through Intelligent Reconfigurable Surface, r represents an actual received signal at a receiving end, m represents a time slot length, $k_i$ represents a difference value between a received signal in an i-th time slot and the reflected signal passing through Intelligent Reconfigurable Surface.

4. The Lorentz constraint angle estimation method in the non-Gaussian environment according to claim 3, wherein the signal sparse reconstruction model is:

$$\min_{x,q} \|r - z\|_{LL_2,\gamma} + \rho\|x\|_A$$

wherein $x=A(\theta)s$, $\rho$ is a regularization parameter and x is the reconstructed signal.

5. The Lorentz constraint angle estimation method in the non-Gaussian environment according to claim 1, wherein the constructing the augmented Lagrangian function comprises:

using an augmented Lagrangian and alternating direction mixed multiplier method to transform a minimum optimization problem of the signal sparse reconstruction model into the augmented Lagrangian function:

$$\mathcal{L}_\tau(x, q, u, t, z, Y, P, w) = \|r - z\|_{LL2},$$

$$\gamma + \frac{\rho}{2}(u_0 + t) + \left\langle P, Y - \begin{pmatrix} Toep(u) & x \\ x^H & t \end{pmatrix} \right\rangle +$$

$$\langle Gx + cq - z, w \rangle + \tau\left\|Y - \begin{pmatrix} Toep^H(u) & x \\ x^H & t \end{pmatrix}\right\|_F^2 + \tau\|Gx + cq - z\|_2^2,$$

wherein x is the reconstructed signal, $c=Ga(\psi)$, $\bar{q}$ is the interference signal, u represents a random signal with a same matrix dimension as the reconstructed signal x, t is an auxiliary variable of the atomic norm, z represents the reflected signal passing through Intelligent Reconfigurable Surface, $$Y = \begin{pmatrix} Toep(u) & x \\ x^H & t \end{pmatrix},$$

P and w are auxiliary parameters in an augmented Lagrangian multiplier method, $\rho$ is the regularization parameter, and $\tau$ is a penalty coefficient in a Lagrangian and alternating direction mixed multiplier method.

6. The Lorentz constraint angle estimation method in the non-Gaussian environment according to claim 5, wherein the carrying out the iterative update on the augmented Lagrangian function comprises:

carrying out the iterative update by using an alternating direction mixed multiplier method, and an iterative equation is:

$(x^{i+1}, q^{i+1}, u^{i+1}, t^{i+1}, z^{i+1}) = \operatorname{argmin}_{x,q,u,t,z}\mathcal{L}_\tau(x,q,u,t,z,Y^i, P^i, w^i)$ $$q^{i+1} = \frac{1}{\tau\|c\|_2^2} c^H(\tau z^i - 0.5w^i - \tau Gx^i)$$

$x^{i+1} = (\tau G^H G + 2\tau I)^{-1}[2\tau y_2^i + p_2^i - G^H(0.5w^i + \tau q^{i+1} c - \tau z^i)]$ $w^{i+1} = w^i + 0.5\rho(Gx^{i+1} + cq^{i+1} - z^{i+1})$ $$z^{i+1} = \frac{2kr + w^{i+1} + 2\tau(Gx^{i+1} + cq^{i+1})}{2k + 2\tau}$$

$$t^{i+1} = y_3^i + \frac{p_3^i}{2\tau} - \frac{\rho}{4\tau}s$$

wherein $(\bullet)^i$ represents an i-th iteration, $q^{i+1}$, $x^{i+1}$, $w^{i+1}$, $z^{i+1}$ and $t^{i+1}$ respectively represent an interference signal, a reconstructed signal, an auxiliary parameter constraining the reconstructed signal, a reflected signal passing through Intelligent Reconfigurable Surface and an atomic norm auxiliary variable of an i+1 iteration.

7. The Lorentz constraint angle estimation method in the non-Gaussian environment according to claim 1, wherein the obtaining the spatial spectral peak points comprises:

analyzing the reconstructed signal by using a multi-signal classification technology to obtain a Hankel matrix, and performing a singular value decomposition on the Hankel matrix to obtain a signal subspace and a noise subspace; using an orthogonality of a signal direction vector and the noise subspace to construct a spatial scanning spectrum, and searching the spectral peaks globally to obtain the spatial spectral peak points, and completing the angle estimation of the reconstructed signal.

8. A system for realizing the Lorentz constraint angle estimation method in the non-Gaussian environment according to claim 1, comprising a received signal model construction module, an angle estimation model construction module, a function construction module, a reconstructed signal obtaining module and a multi-signal classification algorithm analysis module;

the received signal model construction module is used for constructing the N-time slot received signal model;

the angle estimation model construction module is used for constructing a cost function of Lorentz norm constraint by using a difference value between the received signal and the reflected signal passing through Intelligent Reconfigurable Surface, and restating an angle estimation problem into the signal sparse reconstruction model by combining with the atomic norm, and converting the angle estimation problem into a minimum optimization problem;

the reconstructed signal obtaining module is used for obtaining an iterative updating equation by adopting the Lagrangian and alternating direction mixed multiplier method to obtain the reconstructed signal; and the multi-signal classification algorithm analysis module is used for analyzing the reconstructed signal by using the multi-signal classification technology to obtain the Hankel matrix, and performing the singular value decomposition on the Hankel matrix to obtain the signal subspace and the noise subspace; using the orthogonality of the signal direction vector and the noise subspace to construct the spatial scanning spectrum, and searching the spectral peaks globally to obtain the spatial spectral peak points, and completing the angle estimation of the reconstructed signal.

* * * * *